(12) United States Patent
ter Horst et al.

(10) Patent No.: US 9,314,717 B2
(45) Date of Patent: Apr. 19, 2016

(54) EMBOSSED FLUID FILTER ELEMENT

(75) Inventors: Dirk ter Horst, Boca Raton, FL (US); Hans-Joachim Lippold, Lake Worth, FL (US)

(73) Assignee: LPD Technologies, Delray Beach, FL (US)

( * ) Notice: Subject to any disclaimer, the term of this patent is extended or adjusted under 35 U.S.C. 154(b) by 441 days.

(21) Appl. No.: 13/502,755

(22) PCT Filed: Oct. 19, 2010

(86) PCT No.: PCT/US2010/053153
§ 371 (c)(1),
(2), (4) Date: Jul. 2, 2012

(87) PCT Pub. No.: WO2011/049926
PCT Pub. Date: Apr. 28, 2011

(65) Prior Publication Data
US 2012/0261331 A1    Oct. 18, 2012

Related U.S. Application Data (60) Provisional application No. 61/252,832, filed on Oct. 19, 2009.

(51) Int. Cl.
*B01D 29/01* (2006.01)
*B01D 29/11* (2006.01)
*B01D 46/52* (2006.01)
(Continued)

(52) U.S. Cl.
CPC ............ *B01D 29/012* (2013.01); *B01D 29/111* (2013.01); *B01D 46/522* (2013.01); *B01D 46/523* (2013.01); *B01D 29/016* (2013.01); *B01D 2201/12* (2013.01); *Y10T 156/1039* (2015.01)

(58) Field of Classification Search
None
See application file for complete search history.

(56) References Cited

U.S. PATENT DOCUMENTS

| 2,945,559 | A  | * | 7/1960 | Buckman | ......................... 55/500 |
| 5,888,262 | A  |   | 3/1999 | Kaehler |  |
| 6,402,800 | B1 | * | 6/2002 | Rey | ................................ 55/500 |

(Continued)

FOREIGN PATENT DOCUMENTS

| JP | 61115126 | 7/1986 |
| JP | 2003196807 | 7/2003 |

(Continued)

OTHER PUBLICATIONS

Japanese Office action dated Jan. 7, 2014.

(Continued)

*Primary Examiner* — Benjamin Kurtz
(74) *Attorney, Agent, or Firm* — Bachman & LaPointe, PC (57) ABSTRACT

A fluid filter element comprising: an embossed flat filter material which is folded so as to define a plurality of substantially adjacent walls, each wall defining a planar surface between two adjacent fold lines, said wall having an embossing comprising: a first embossing row having a centrally located elongated positive embossment and a distal embossment at each end of the positive elongated embossment, wherein at least one distal embossment is negative; and, a second embossing row spaced from and parallel to the first embossing row, the second embossing row having two elongated embossments, wherein one elongated embossment is negative and one is positive. A method regarding the making of the same.

8 Claims, 10 Drawing Sheets (51) Int. Cl.
*B01D 29/07* (2006.01)
*B01D 29/21* (2006.01)

(56) References Cited

U.S. PATENT DOCUMENTS

| | | |
|---|---|---|
| 6,685,833 B2 | 2/2004 | Lippold |
| 7,116,288 B2 | 10/2006 | Shiizaki et al. |
| 7,122,068 B2 | 10/2006 | Tate et al. |
| 7,425,227 B1 | 9/2008 | Hutchison et al. |
| 7,661,540 B2 | 2/2010 | Choi |
| 8,363,078 B2 | 1/2013 | Kitamura |
| 2002/0033224 A1 | 3/2002 | Lippold |
| 2003/0075500 A1 | 4/2003 | Kleinguenther et al. |
| 2005/0072131 A1* | 4/2005 | Tate et al. ............... 55/497 |
| 2005/0139544 A1 | 6/2005 | Choi |
| 2006/0231482 A1 | 10/2006 | Khalil et al. |
| 2008/0067121 A1 | 3/2008 | Ter Horst et al. |
| 2008/0120952 A1* | 5/2008 | Chilton et al. ............ 55/488 |

FOREIGN PATENT DOCUMENTS

| | | |
|---|---|---|
| JP | 20030284914 | 10/2003 |
| JP | 2004321937 | 11/2004 |

OTHER PUBLICATIONS

Chinese Office action dated Nov. 25, 2013.
Indonesian Office action for Application No. W00201201960 dated Mar. 4, 2015.

* cited by examiner

EMBOSSED FLUID FILTER ELEMENT

BACKGROUND OF THE INVENTION

This invention relates to a fluid filter element and method of forming the same.

Fluid filter elements are well known and are widely used in fluid filters for varying areas of use, including hydrodynamic machines and air-conditioning engineering. Their meander-shaped or zig-zag structure provides a substantially increased filter area, in relation to a fixed afflux flow cross-section. In order to fix the fold walls of such a structure relative to each and to support them with respect to each other, various different kinds of design configurations have been developed. Filters with depressions which are embossed into the flat filter material and which, when the material is folded, bear against each other and support each other are known.

In the case of earlier fluid filter elements of that kind, the embossings of the fold walls were simply laid against each other when executing the folding operation and the filter element, which was finished as a kind of "fold pack" which was externally fixed by being clamped in a box or frame. While such particularly simple fluid filter elements certainly operate satisfactorily at the beginning of their period of use and in areas of use which do not involve fluctuating pressure loadings worth mentioning, critical stability problems are found to occur in relation to certain degrees of filling with deposited dust particles, or dust loading, and in particular when used in relation to fluid-dynamic machines.

In order to resolve many of the above problems, U.S. Pat. No. 6,685,833 assigned to LPD technologies discloses a filter element comprising an embossed flat filter material which is folded so as to define a plurality of substantially adjacent walls, each wall having an embossing comprising a first embossing portion which extends from one side of said wall and a second embossing portion which is adjacent to said first embossing portion and which extends from the other side of said wall, and an adhesive connecting adjacent embossings of adjacent walls. The adhesive preferably has a substantially constant height. U.S. Pat. No. 6,685,833 is hereby incorporated by reference in its entirety.

SUMMARY OF THE DISCLOSURE

The primary object of the present disclosure is to provide a filter material with embossings that eliminate a rotation point within the pleat.

It is a further object of the present invention to provide a fluid filter element with an embossed flat filter material which is folded so as to define a plurality of substantially adjacent walls, each wall defining a planar surface between two adjacent fold lines, the wall having an embossing comprising: a first embossing row having a centrally located elongated positive embossment and a distal embossment at each end of the positive elongated embossment, wherein at least one distal embossment is negative; and a second embossing row spaced from and parallel to the first embossing row, the second embossing row having two elongated embossments, wherein one elongated embossment is negative and one is positive.

It is a further object of the present invention to provide a method for forming a fluid filter element, comprising the steps of: providing a flat filter material; forming a plurality of substantially parallel embossings in the filter material, the embossings comprising alternating first and second embossing rows, the first embossing row having a centrally located elongated positive embossment and a distal embossment at each end of the positive elongated embossment, wherein at least one distal embossment is negative; and the second embossing row spaced from and parallel to the first embossing row, the second embossing row having two elongated embossments, wherein one elongated embossment is negative and one is positive; applying an adhesive to at least a portion of the embossings; and folding the filter material in a zig-zag pattern so as to define walls of the filter material, each wall having the alternating first and second embossing rows, wherein the adhesive bonds the embossings of adjacent walls together.

BRIEF DESCRIPTION OF THE DRAWINGS

A detailed description of preferred embodiments of the present invention follows, with reference to the attached drawings, wherein.

DETAILED DESCRIPTION

This disclosure is drawn to a filter material with embossings that eliminate a rotation point within the pleat. Embossings, i.e. dimples, are formed on the filter material by any means which is well known within the art. One objective of the present invention is to reduce the pressure drop within the system by reducing the embossed surface area of the filter paper, i.e. standard intermediate embossings are removed, and by improving the aerodynamics, which keeps the pleat from deforming.

Figure 1:
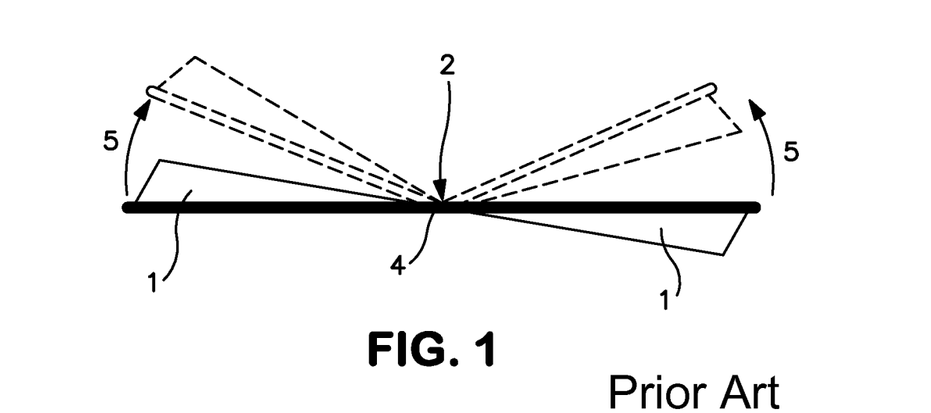
FIG. 1 illustratively depicts a side view of a filter material and embossed in accordance with U.S. Pat. No. 6,685,833.
Figures 8, 9, 10:
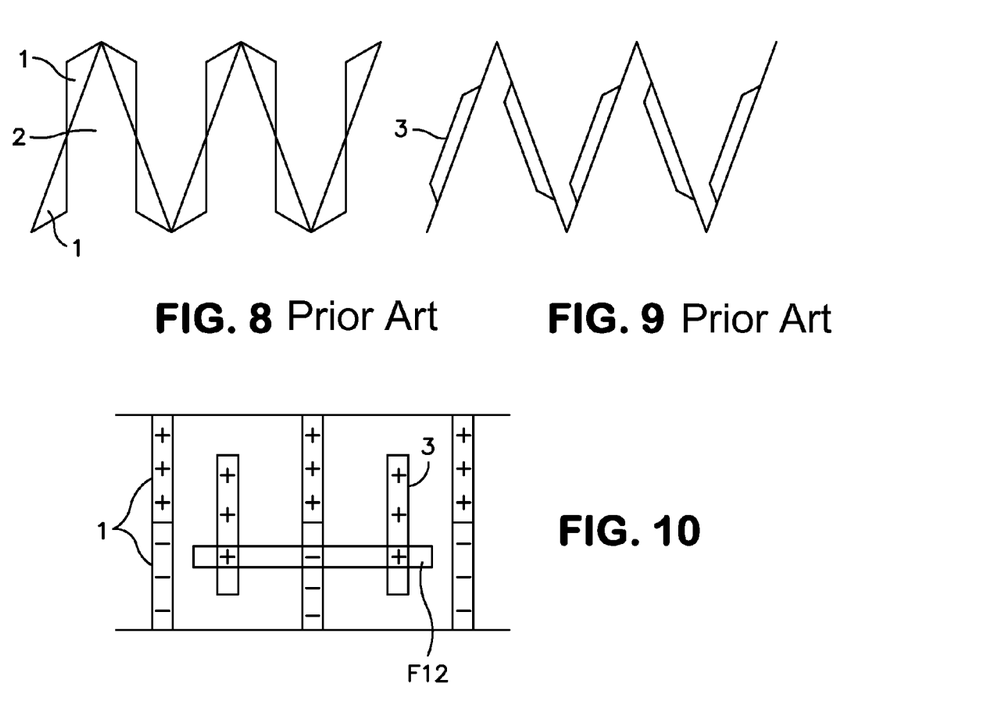
FIGS. 8, 9 and 10 illustratively depict differing variations of filter material embossings.

FIG. 1 illustrates a wall of filter material 4 and the structure of embossings 1 formed in filter material 4 in accordance with U.S. Pat. No. 6,685,833. FIG. 8 illustrates a side view of a folded series of the walls of FIG. 1. FIG. 1 shows flat material 4 provided with a series of embossings 1 which would be arranged in parallel rows wherein each embossing 1 is substantially planar and has a first embossing portion extending from one side of material 4 and a second embossing portion extending from the other side of material 4. These embossings can advantageously be formed in material 4 using embossing rollers or any other apparatus suitable for forming contoured structure in material 4 as desired. During use, pressure is exerted on the filter material 4, and the material begins to bend at rotation point 2, which is the point where the embossing 1 passes from one side of the material 4 to the other. This results in bending of the wall having embossings 1 in the direction of arrows 5. Rotation point 2 renders the complete pleating of the filter material 4 very difficult and also results in an unstable filter. Bending of the filter material 4 around the rotation point 2 also increases the pressure of the flow through the filter material 4 leading to a negative change in aerodynamics.

Figure 2:
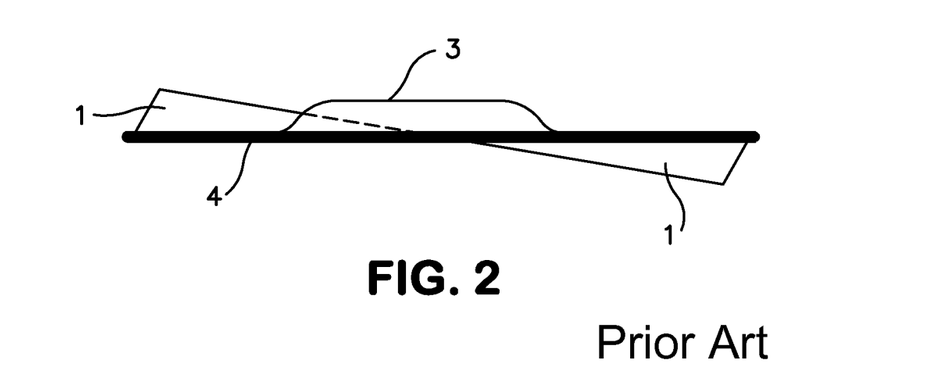
FIG. 2 illustratively depicts a side view of a filter material embossed with an intermediate embossment at the rotation point within the pleat.
Figure 2A:
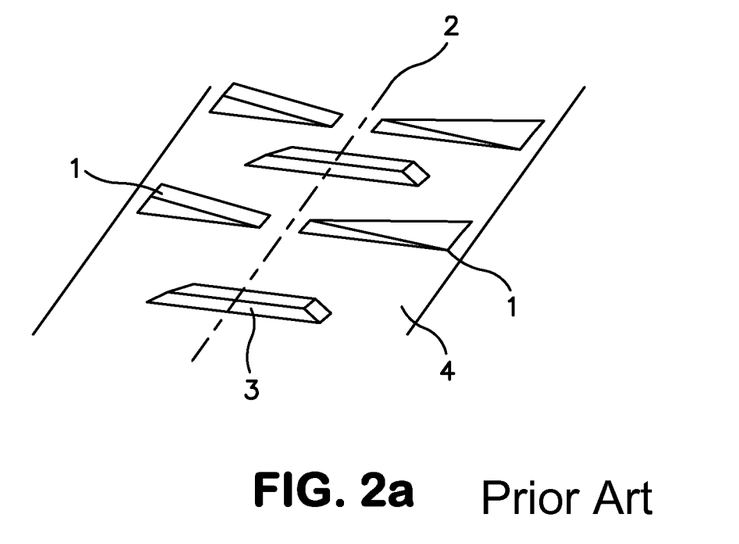
FIG. 2a illustratively depicts a top view of the filter material of FIG. 2.

FIGS. 2, 2a and 9 depict the introduction of an intermediate embossing 3. FIG. 9 illustrates a side view of a folded series of walls to illustrate the position of embossing 3. FIGS. 2 and 2a further illustrate walls 4 having embossings 1 and intermediate embossing 3 of filter material 4. The intermediate embossing 3 is positioned in an alternating position between embossings 1. The placement of the intermediate embossing 3, as shown in FIG. 2a, helps to avoid the undesirable characteristics described above by providing stiffness of the material 4 against bending around point 2 of the pleat. Intermediate embossing or dimple 3 stiffens the filter wall at the rotation point 2 of FIG. 1, but this extra embossing leads to more cost in preparation and can also reduce the effective filter area of the filter.

Figure 3:
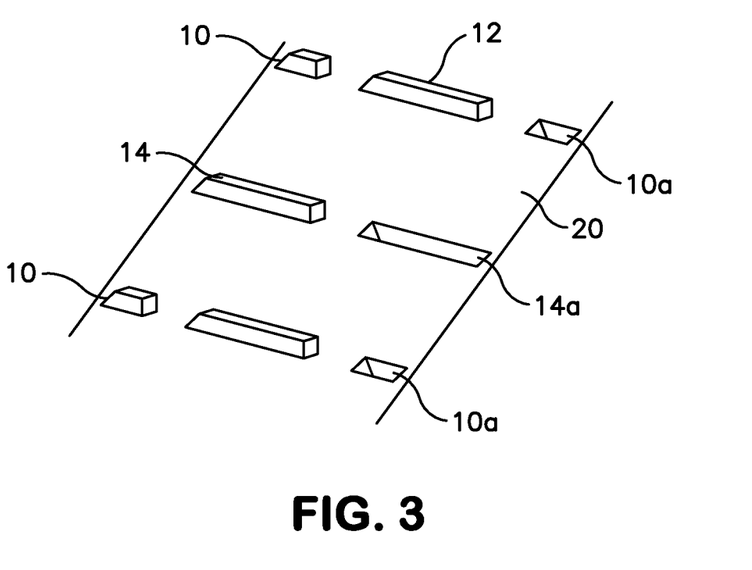
FIG. 3 illustratively depicts a top view of the filter material and embossed in accordance with the present invention.

FIG. 3 depicts a preferred orientation of embossings 10, 10a, 12, 14, 14a in accordance with the present invention. A first embossing row, 10, 10a, 12, is shown having a centrally located elongated positive embossment 12 and distal embossment 10, 10a at each end of the positive elongated embossment 12. At least one distal embossment 10a in the first embossing row is negative, that is, it extends from the sheet of the filter material in a direction opposite to that of embossments 10, 12, which are considered positive. A second embossing row having two elongated embossments 14, 14a is also formed and positioned at a location laterally spaced from embossments 10, 12, 10a. The alternating embossment segments avoid locations where an embossment transitions between negative and positive and thereby avoids the formation of bending lines or rotation points 2 as are present in the prior art configurations. At least one elongated embossment 14a is negative.

Figure 4:
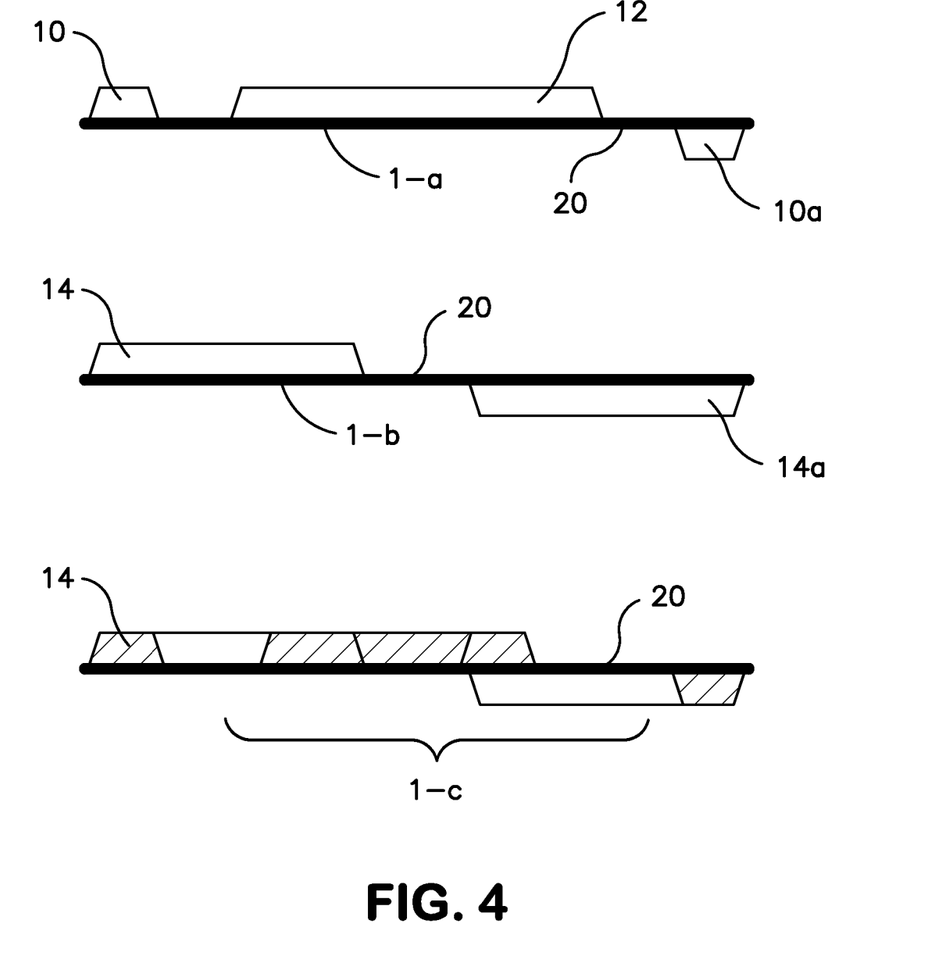
FIGS. 4a-4c illustratively depict side views of the filter material in accordance with the present invention.

FIGS. 4a and 4b depict the first embossing row 1-a and the second embossing row 1-b, respectively. When folded into a filter structure, the first embossing row 1-a and the second embossing row 1-b extend parallel to each other along the material and the overlap of the various embossed segments prevents the formation of a rotation point as was formed in the material 4 of FIG. 1.

Figure 5:
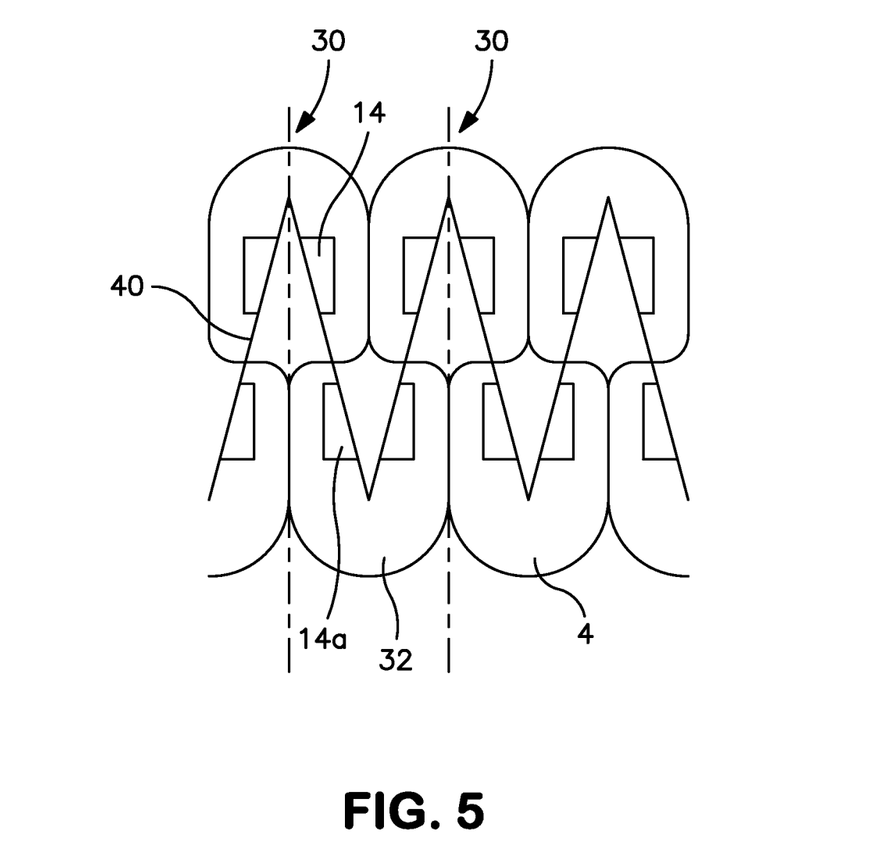
FIGS. 5 and 6 illustratively depict the first embossing row in a view in section in a plane parallel to the fluid flow direction and perpendicular to the plane of the filter material, illustrating an embodiment of the filter element according to the invention.
Figure 6:
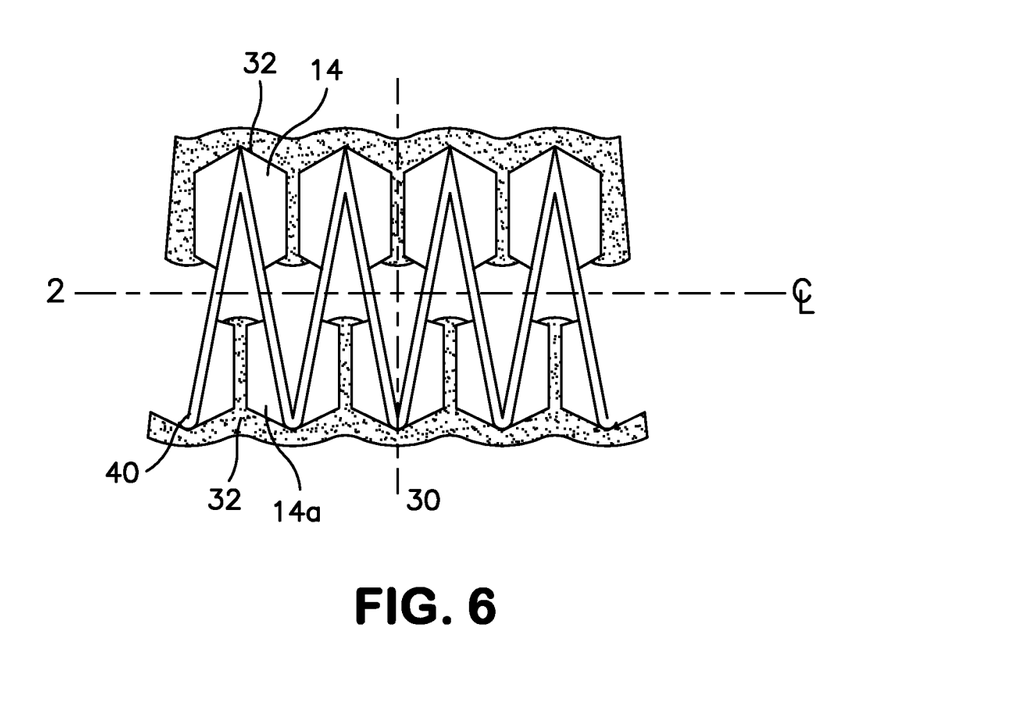

FIGS. 5 and 6 illustrate a portion of a filter in accordance with the present invention drawn through embossings 14, 14a. The filter media 20 according to the invention is formed from a filter fleece or non-woven cloth material, typically made from glass fiber and plastic fiber components or the like. Fold edge regions 30, 32 define walls 40 of material 20 therebetween, and embossing portions 14 and 14a are advantageously defined in a single plane, and the plane of embossing portions 14 and 14a is preferably oriented relative to the plane of walls 40 such that when material 20 is folded into the "V" pattern shown in FIGS. 5 and 6, embossing portions 14 and 14a are substantially parallel to and equally spaced from embossing portions 14 and 14a of adjacent walls 40.

Hot melt adhesive threads 32 are applied on both sides in the region of the embossings 14 and 14a. When folded to the position shown in FIGS. 5 and 6, the hot melt adhesive threads 32 join together to form interconnected adhesive support portions. The mutually adjacent fold walls 40, after the adhesive 32 has set, are respectively clamped firmly in position on both sides, by virtue of those adhesive support portions 32, which is a substantial improvement over prior art configurations.

Figure 7:
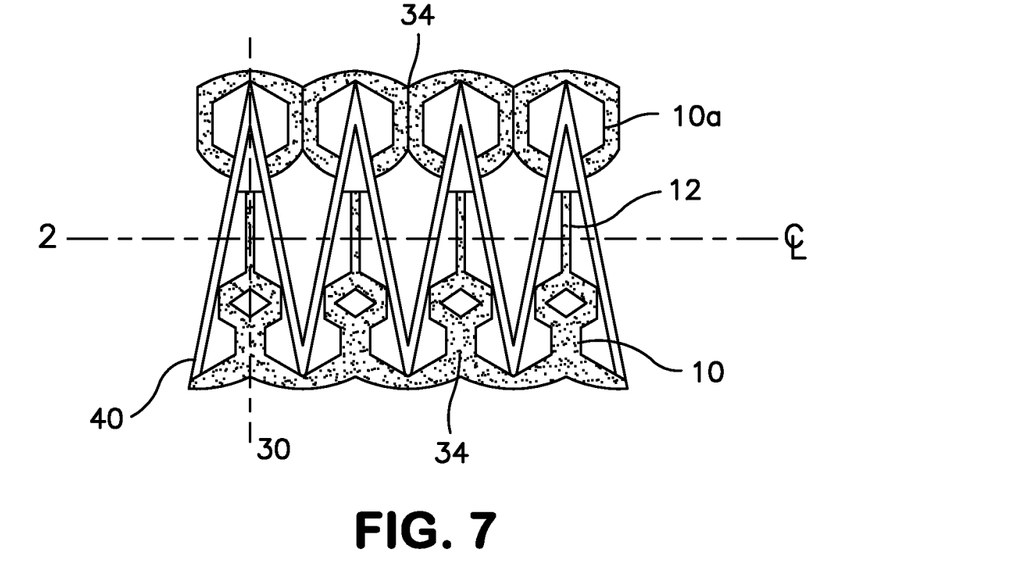
FIG. 7 illustratively depicts the second embossing row in a view in section in a plane parallel to the fluid flow direction and perpendicular to the plane of filter material, illustrating an embodiment of the filter element according to the invention.

FIG. 7 illustrates a portion of a filter in accordance with the present invention drawn through embossings 10, 12, 10a. The filter media 20 according to the invention is formed from a filter fleece or non-woven cloth material, typically made from glass fiber and plastic fiber components or the like. Fold edge regions 30, 32 define walls 40 of filter media 20 therebetween, and embossing portions 10, 10a, and 12 are advantageously defined in a single plane, and the plane of embossing portions 10, 10a, and 12 is preferably oriented relative to the plane of walls 40 such that when material 20 is folded into the "V" pattern shown in FIG. 7, embossing portions 10, 10a, and 12 are substantially parallel to and equally spaced from embossing portions 10, 10a, and 12 of adjacent walls 40.

Hot melt adhesive threads 34 are applied on both sides in the region of the embossing 10a alone and embossings 10 and 12 in conjunction. When folded to the position shown in FIG. 7, the hot melt adhesive threads 34 join together to form interconnected adhesive support portions. The mutually adjacent fold walls 40, after the adhesive 34 has set, are respectively clamped firmly in position on both sides, by virtue of those adhesive support portions 34, which is a substantial improvement over prior art configurations.

Figure 11:
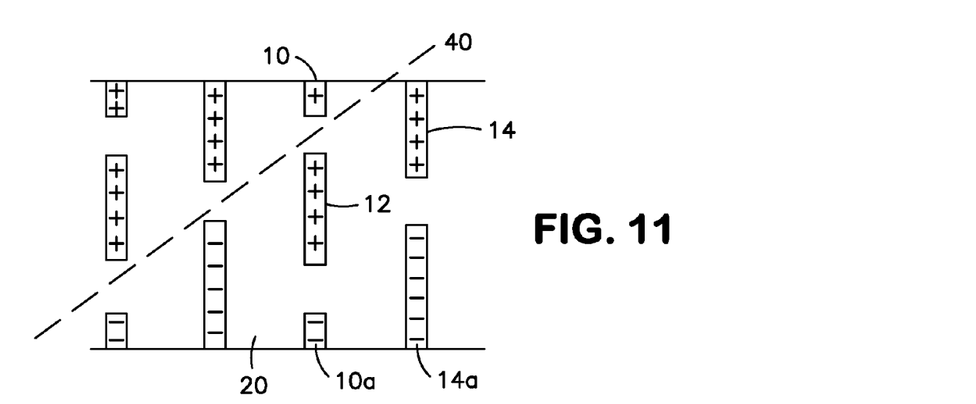
FIG. 11 illustratively depicts a top view of the filter material embossed in accordance with the present invention.
Figure 12:
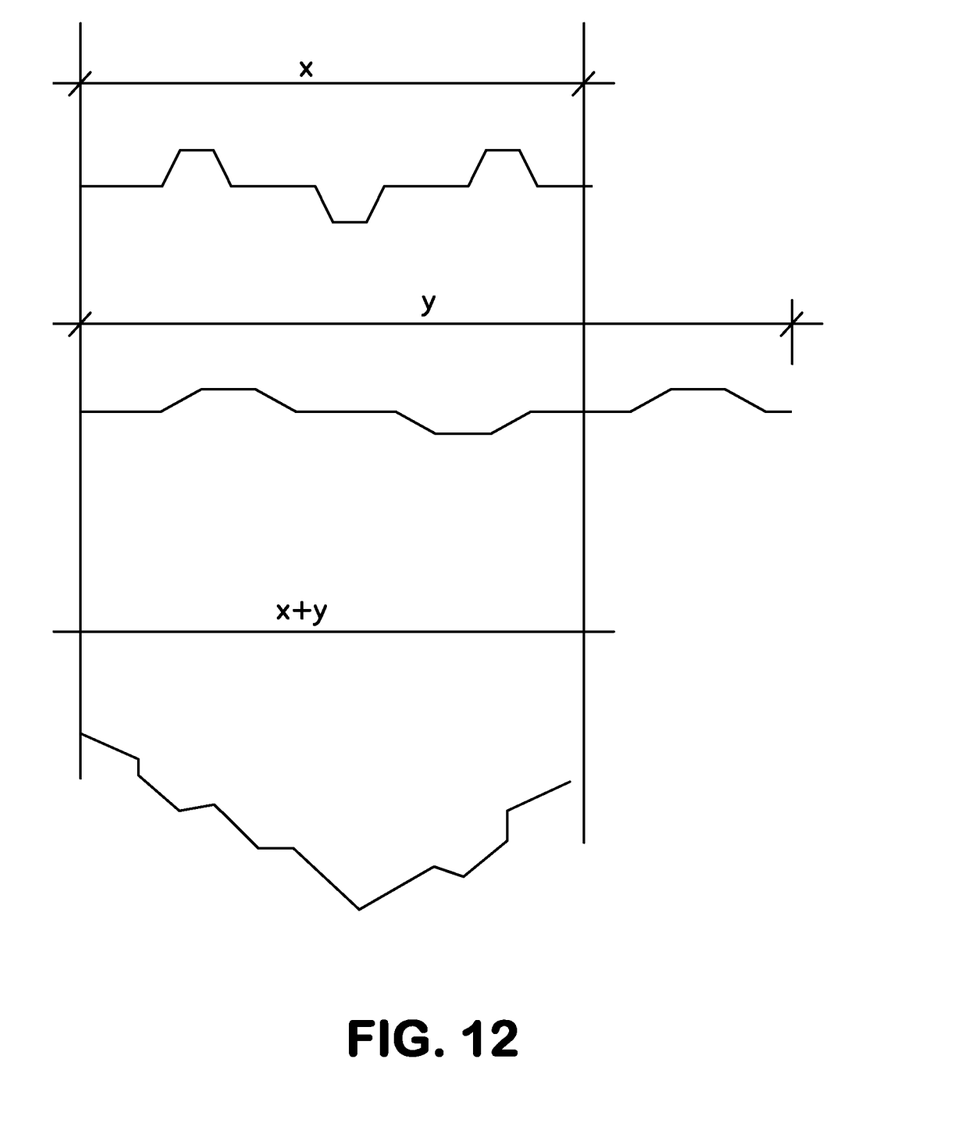
FIG. 12 illustrates the accordion effect on embossed filter media.

An additional undesirable bending or accordion effect is illustrated in FIG. 12. The accordion effect contributes to the deformation of the pleat, which in turn increases the pressure drop of the filter due to the bad aerodynamics of a deformed (not a perfect V shaped) pleat. The views of FIG. 12 illustrate this undesirable bending, which can happen when embossings spread laterally as shown. x represents the ideal configuration of a cross section of embossings. See FIG. 10 section F12. As air blows through filter media 20, pressure increases and the embossings begin to laterally spread, as illustrated by y. The pleated filter media 20 will begin to flatten and lose resistance to bending. As a result of the continuing increase in pressure, the embossings will lose form, as illustrated by x+y. When the embossings stretch and lose form the pleats also will stretch and lose form, as shown in the third view of FIG. 12. Intermediate embossings positioned according to the invention leave unembossed zones of material that help resist lateral spreading of the embossments, because the flat, non-embossed portion of material helps to resist the lateral spreading. Preferably, the non-embossed portions are positioned so that, taken together, they define a diagonal line (See FIG. 11) of embossing free filter media which helps to prevent stretching of the pleat and embossings.

The configuration of the embossings according to the invention eliminates both rotation point 2 of FIG. 1 and the accordion effect of FIG. 12. The filter portions shown in FIGS. 5-7 illustrate the orientation of the folded and glued filter media 20 as shown in FIGS. 3 and 11. The configuration of the dimples eliminates the horizontal rotation point 2 by creating a more desirable diagonal line 40 of unembossed portions of filter media 20. This configuration of the unembossed to embossed portions of filter media 20 reduces the accordion effect, wherein the embossings rest upon one another to support the filter media 20 as air is forced through it.

As seen in FIG. 11, the main intermediate embossing 12 is both above and below diagonal 40. Intermediate embossing 12 is able to perform a double function. In order to sustain the pressure within the system, embossing 12 helps to keep the pleated filter media 20 as straight as possible and embossing 12 also helps to keep the accordion effect of material 20 to a minimum. Diagonal 40 helps to decrease the pressure flow through filter media 40 leading to less resistive aerodynamics through the system. The current design illustrated in FIGS. 3-7 reduces the pressure drop caused by deformation of the filter walls and thereby preserving the desired flow characteristics of the filter.

FIGS. 5 through 7 show fold lines 30 for material 20, which are present along fold edges of material transverse to the embossings as shown for example in FIGS. 3 and 11. The preferred orientation of embossing rows 1-a and 1-b provide that when folded, first embossing portions 1-a will face each other, and second embossing portions 1-b will also face each other. Embossing rows 1-a and 1-b are positioned substantially parallel to each other so as to facilitate application of adhesive to embossing rows 1-a and 1-b at a constant flow-rate of adhesive, which provides for a constant height or amount of adhesive per length as desired in accordance with the present invention.

Figure 13:
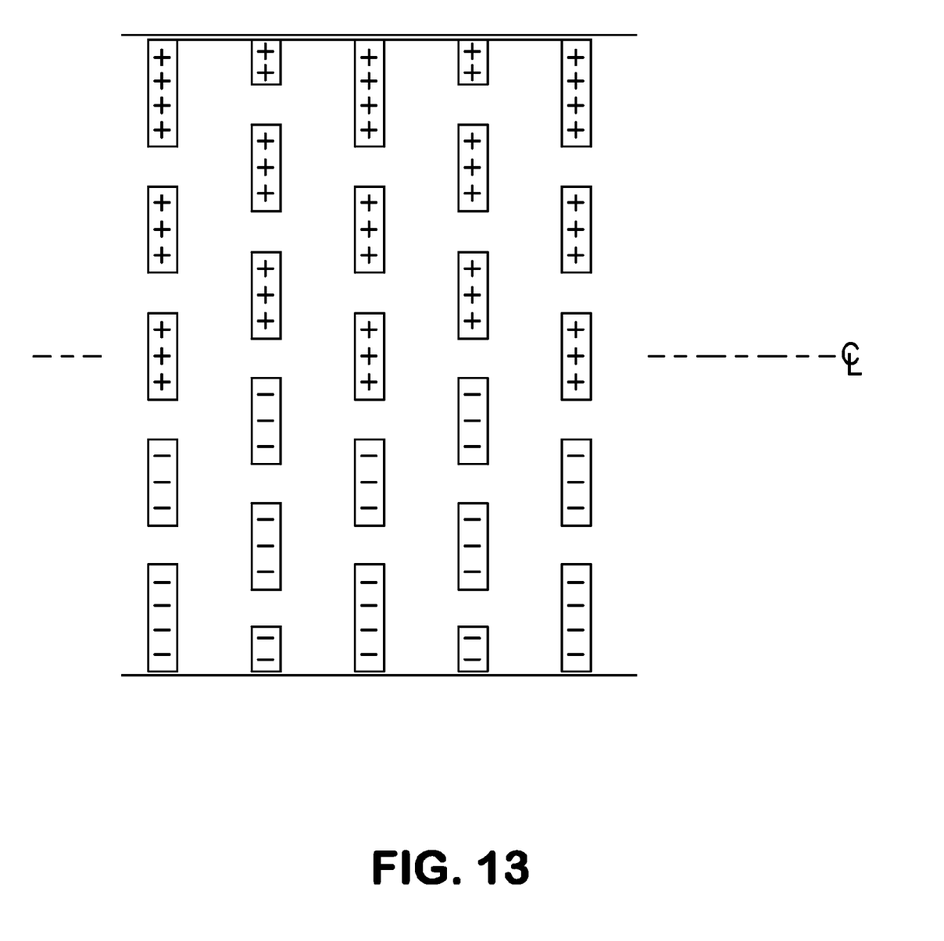
FIG. 13 illustratively depicts a top view of the filter media of the present invention with a plurality of intermediate embossings.

FIG. 13 depicts the filter media of the present invention with a plurality of intermediate embossings, i.e. positive embossments, negative embossments and combinations thereof. It has been found that an increase in the number of intermediate embossings will increase the strength of the filter material and decrease the bending of the walls due to force exerted on the filter material by the air pressure.

Figure 14:
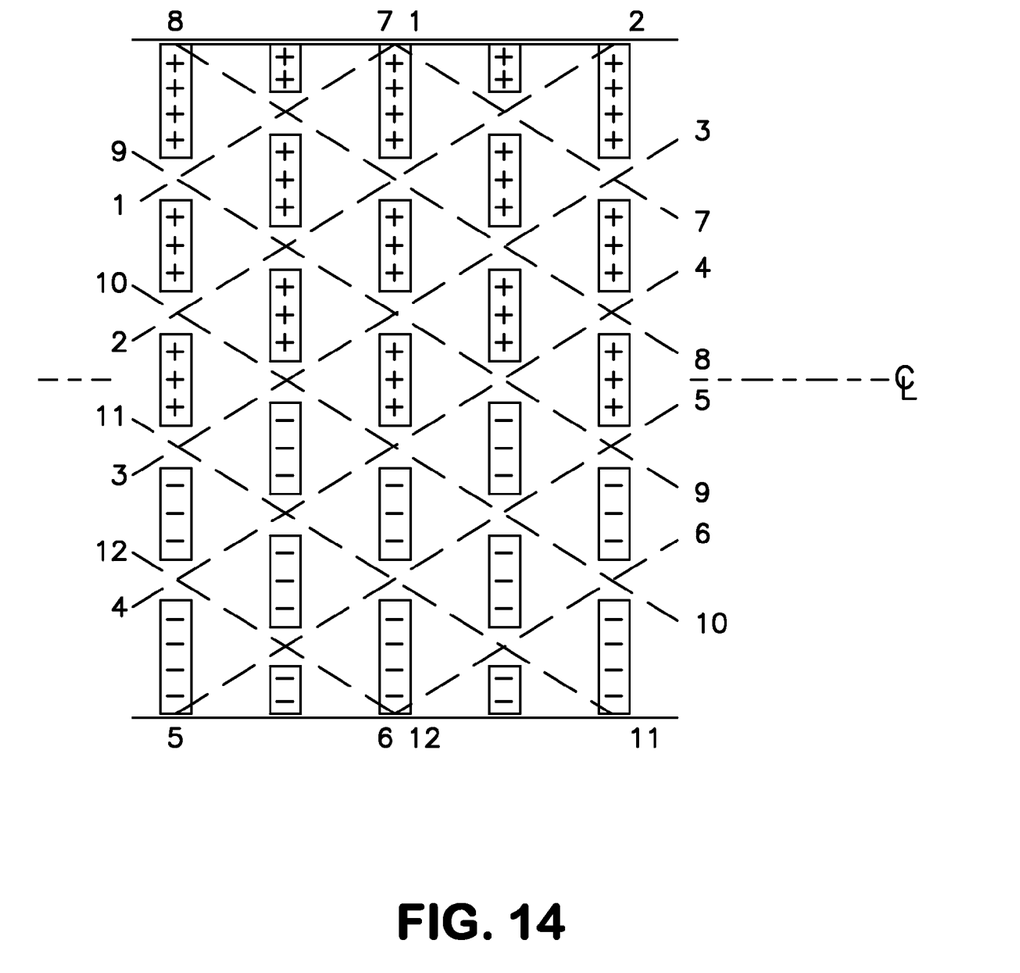
FIG. 14 illustratively depicts a top view of the filter media of the present invention with a plurality of intermediate embossings and diagonal straight lines obtained.

FIG. 14 depicts the diagonal straight lines of non-embossed material that may be formed on filter media comprising a plurality of intermediate embossings. As shown, the intersecting diagonal lines of non-embossed material can provide a truss-like reinforcement to the wall to prevent accordion or spreading of the embossed portions.

Figure 15:
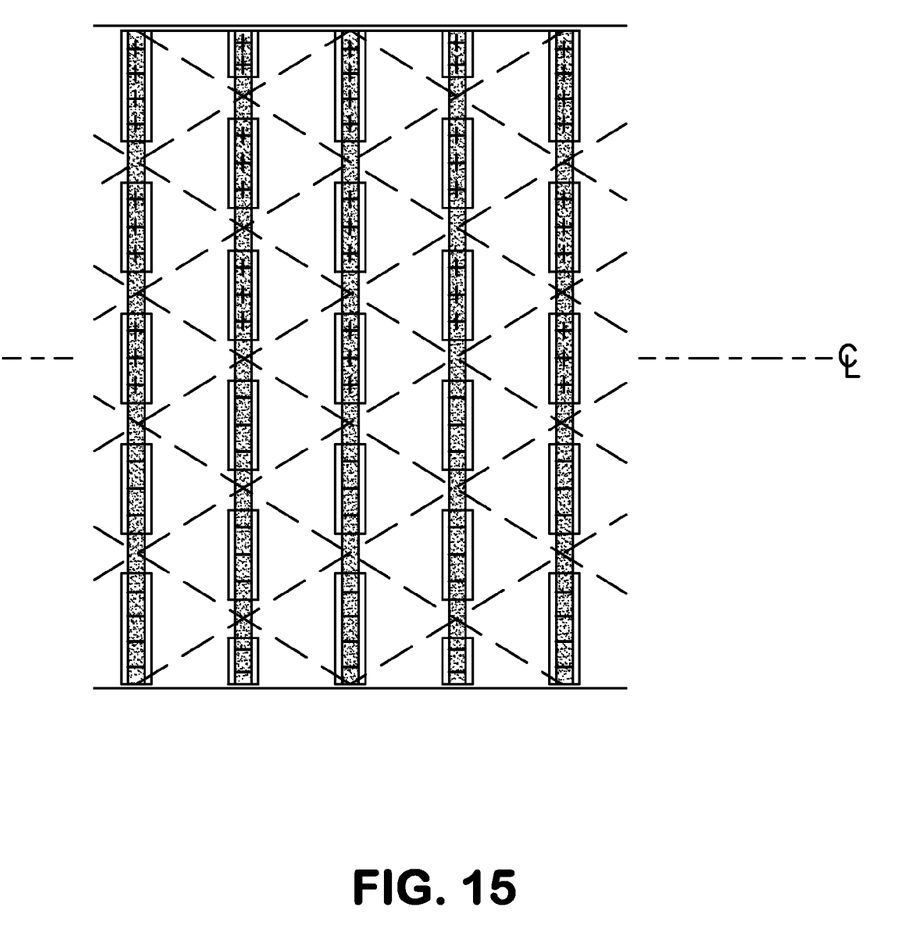
FIG. 15 illustratively depicts a top view of the filter media of the present invention with glue placement on a plurality of intermediate embossings.

FIG. 15 depicts the placement of the glue on filter media comprising a plurality of intermediate embossings.

It is to be understood that the present disclosure is not limited to the illustrations described and shown herein, which are deemed to be merely illustrative of the best modes of carrying out the invention, and which are susceptible of modification of form, size, arrangement of parts and details of operation. The present disclosure rather is intended to encompass all such modifications which are within its spirit and scope as illustrated by the figures and defined by the claims.

What is claimed is:

1. A fluid filter element comprising:
an embossed flat filter material which is folded so as to define a plurality of substantially adjacent walls, each wall defining a planar surface between two adjacent fold lines, said wall having an embossing comprising:
a first embossing row having a centrally located elongated positive embossment and a distal embossment at each end of the positive elongated embossment, wherein at least one distal embossment is negative; and
a second embossing row spaced from and parallel to the first embossing row, the second embossing row having two elongated embossments, wherein one elongated embossment is negative and one is positive, wherein the elongated embossment of the first row has a greater dimension along the first embossing row than transverse to the first embossing row and wherein the elongated embossments of the second row have a greater dimension along the second embossing row than transverse to the second embossing row, and wherein said first embossing row and said second embossing row define a straight diagonal line of embossing free filter material extending continuously between the fold lines, wherein spaces are defined along the first embossing row between the centrally located positive embossment and each of the distal embossments, wherein a space is defined along the second embossing row between the two elongated embossments, and wherein the spaces of the first embossing row and the space of the second embossing row which is adjacent to the first embossing row are not horizontally aligned with each other.

2. The filter element of claim 1, wherein the second embossings are substantially uniformly spaced.

3. The filter element of claim 1, wherein said walls define wall edges each having at least two fold lines.

4. The filter element of claim 1, wherein said first embossing row and said second embossing row are formed in alternating sequence.

5. The filter element of claim 1, wherein said first embossing row further comprises a plurality of centrally located elongated embossment selected from the group consisting of positive embossment, negative embossment and combinations thereof.

6. The filter element of claim 1, wherein the elongated embossment of the first row has the same length as the elongated embossments of the second row.

7. The filter element of claim 1, wherein the spaces of the first embossing row and the space of the second embossing row which is adjacent to the embossing row are aligned with each other along a line which is diagonal to the first and second embossing rows.

8. A fluid filter element comprising:
an embossed flat filter material which is folded so as to define a plurality of substantially adjacent walls, each wall defining a planar surface between two adjacent fold lines, said wall having an embossing comprising:
a first embossing row having at least two elongated embossments including at least one positive embossment and at least one negative embossment and a space between the at least two elongated embossments, wherein the elongated embossments have a greater dimension along the first embossing row than transverse to the first embossing row; and
a second embossing row spaced from and parallel to the first embossing row, the second embossing row having at least two elongated embossments, including at least one positive elongated embossment and at least one negative elongated embossment and a space between the at least two elongated embossments; wherein the elongated embossments of the second embossing row have a greater dimension along the second embossing row than transverse to the second embossing row, and wherein said first embossing row and said second embossing row define a straight diagonal line of embossing free filter material which extends continually between the side edges, and wherein the space of the first embossing row and the space of the second embossing row which is adjacent to the first embossing row are not horizontally aligned with each other.

* * * * *